April 27, 1954 H. J. FREY 2,677,030

ELECTROMAGNETIC CONTROL SYSTEM

Filed Oct. 3, 1947

INVENTOR
HANS JAKOB FREY
BY *Morry & Hall*
ATTORNEYS

UNITED STATES PATENT OFFICE 2,677,030

ELECTROMAGNETIC CONTROL SYSTEM

Hans Jakob Frey, Zurich, Switzerland, assignor to Edgar Gretener, Zurich, Switzerland Application October 3, 1947, Serial No. 777,657

Claims priority, application Switzerland October 5, 1946

10 Claims. (Cl. 200—97)

The present invention is concerned with electromechanical control systems and is the equivalent of the parent Swiss application No. 15,958, filed in Switzerland October 5, 1946.

It is an object of the invention to provide means to control energy by an electromagnet having a movable armature which is unloaded during the initial portion of its movement cycle.

It is an object of the invention to provide means to control energy of an electromagnet having an armature cycle including a positive mechanical return.

It is an object of the invention to provide energy control by varying flux density in a portion of the control means.

It is an object of the invention to provide energy control means which has suitable free travel.

A basic problem in the field of regulation of electrical values is the control or regulation of an electrical magnitude such as voltage, current or power between specified maximum and minimum limits. In the case of automatic loading devices the problem is to cut in or cut out the loading or charging current in relation to the battery voltage. Voltage regulators, constant current transformers and the like are well known, but these do not operate within a sufficiently narrow limit for many applications. They are primarily for large power installations and are not suited for finer control operations. The best known means for solving this problem are the voltage relay and the contact voltmeter. Neither is entirely satisfactory in practice.

The contact volt meter is a measuring instrument which has a contact arm mounted for rotation between two contacts. The principal disadvantage in using such equipment for sensitive work in low value circuits lies in the extremely small forces available to operate the meter. As the specific maximum or minimum value requiring control operation is reached the pressure on the contact surface is very light and becomes operative to close the control circuit effectively only after the limiting value is exceeded. Such an instrument is therefore suitable only for breaking small loads of the order of a tenth of a watt.

Where relays are used other difficulties arise because of the definite relationship existing between the values at which such a relay will make or break contact rendering it impossible to bring these values within the desired narrower limits. For most installations it has therefore been necessary to utilize a combination of two or more relays, each having a specific function, e. g., one operating at the maximum allowable value of the range and another operating at the minimum value. Such arrangements are relatively highly sensitive to shock. Of greater importance is mutual effect or reaction one such relay may have on another where the maximum and minimum values closely approach each other and the permissible tolerance is very small. Under these exacting conditions there is a tendency for both relays to operate as the controlled value hunts between the two limits and what may be called rhythmical switching occurs.

It is an object of the invention to eliminate the above difficulties. The proposed arrangement includes an electromagnetic system having at least one winding which is energized as a function of the controlled magnitude. Aside from the magnetic force, a directional force, preferably a spring force is caused to act on the movable portion of the system which in one form of the invention is an armature.

When the field flux reaches a certain value as measured in ampere turns the armature begins to move. At this stage of the operation the armature moves freely under no load conditions. This is achieved by making the initial part of the armature path a lost motion or better a momentum attaining portion. In this way easily supervized and well defined relations are achieved for the make or approach value. The load placed on the armature by the control member, that is the contact arrangement, first comes into play after the armature path has been so far traversed that the then ensuing load cannot hamper the movement of the armature, so that once the armature movement is initiated the armature rapidly accelerates and by the time the contact operating load is applied the momentum plus the increasing pull of the strengthening field carry it forcefully the full extent of its path. The return of the loaded armature is effected periodically by special means. The basic idea of the arrangement is that the control action of the electromagnetic system is effective during the no load operation thereof. A simple and reliable arrangement for the return of the armature to its starting position may be provided by using a cam disc which is driven by a separate source of power.

In the embodiment just described the operation is based on the attraction value of the electromagnetic system comprising magnet coil and armature, i. e. on the critical value of the factor to be regulated which is related to the attraction value of said system in such a way that the regulating operation is started when the magnetic field exceeds said attraction value. The second characteristic value of an electrotechnical system generally referred to as the falling-off value, i. e. the value at which the armature will fall back to its unattracted position, which in normal electromagnetic systems is considerably lower than the attraction value, remains without effect in the embodiment according to the present invention, as the armature in contrast to customary relays will not remain attracted as long as the value to be regulated has not fallen below the value corresponding to said falling-off value but is periodically returned to its initial position away from the magnet by said special means. After each of such periodically occurring returns to its initial position the armature will attract only if the magnetic field is still equal or above the attraction value. Consequently the control device will be operative, though periodically interrupted, only if the value to be regulated is above a limit related to said attraction value, or inoperative if it stays below said valve.

A device according to the present invention may however, also be operated in the opposite sense, i. e. based upon the falling-off value, where the attraction value and its difference from said falling-off value is of no importance. In this case the armature is periodically returned by said special means to its attracted position close to the magnet coil, and will either fall-off if the magnetic field is below said critical value or stay in its attracted position if the field exceeds that critical value. Consequently the control device will be operated, though periodically interrupted, if the value to be regulated is above a limit related to said falling-off value, or inoperative if it stays below said value. The attracting circuit arrangement has definite advantages over the drop off circuit arrangement. The relatively large air gap serves greatly to eliminate undesired remanence reaction. Also small inaccuracies in the airgap have comparatively little influence on the regulation value and the system is less sensitive to shocks. In systems working on the approach principle it is possible to use a return position in which the energizing circuit is periodically interrupted. This method appears less advantageous when it is undesirable to have contacts in the energizing current circuit, which can be avoided by using a mechanical restoring system.

In the drawings like numerals refer to like parts throughout.

Figure 1:
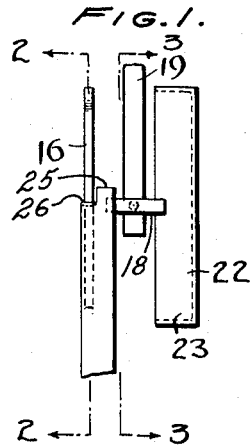
Fig. 1 is a fragmentary schematic elevation of one form of control device.

The magnet system consists of an electro magnet 10 with an armature 11 the positioning of which is preferably effected by a spring 12, eliminating much inherent friction and yielding greater regulation accuracy. Air gap 13 may be adjusted by regulating screw 14. The return to open or rest position is effected once each revolution by rise 15 of cam disc 16 which is rigidly mounted on drive shaft 17.

The drive shaft 17 is driven by a continuous rotating source of energy. Small synchronous motors such as are used in electric clocks are suitable as are also D. C. motors, clock work with electro magnetic winding and the like.

The movement of the armature 11 when the attraction system is used is effected at first without load through the agency of transverse or cross member 18 of the spring unit 19, because of the free path 20 between armature 11 and cross member 18. This distance is the distance of no load movement of armature 11. The above system operates on the attraction principle. At a certain value of magnetic flux as determined by the effective number of ampere turns the armature 11 starts moving toward the magnet 10.

The regulation of the approach value may be obtained for example by changing the preliminary tension of spring 12. The strength of the magnetic field may be adjusted by introducing or removing series or parallel resistance in the circuit of coil 10. The characteristics of the power stroke of the armature 11 and the spring unit 19 are such that the initial unloaded preliminary motion of armature 11 is not affected by the subsequently added load of the spring unit 19.

If the rise 15 of cam disc 16 forces armature 11 into its position of rest the contacts 21 on spring unit 19 would be opened once for each revolution of cam disc 16 and the regulatory operation would be periodically interrupted. This undesirable action is prevented by control disc 22 which likewise is rigidly mounted on drive shaft 17 and by means of flange 23 maintains the spring unit 19 in operative relation through the agency of cross member 18.

The flange 23 is preferably formed as a ring provided with a small gap or segment of arc 24 determined by the central angle alpha. The operation of the contacts 21 is then possible only during the comparatively short period when the traverse or cross member 18 is opposite the gap 24 in flange 23. In general the sensitivity to shock of the system will be effectively reduced thereby. Armature 11 and spring 12 are joined and have an extension 25 which may be part of spring 12 or other material. Extension 25 is positioned to engage member 18 and has a bent cam follower 26 engaged by rise 15.

Figure 2:
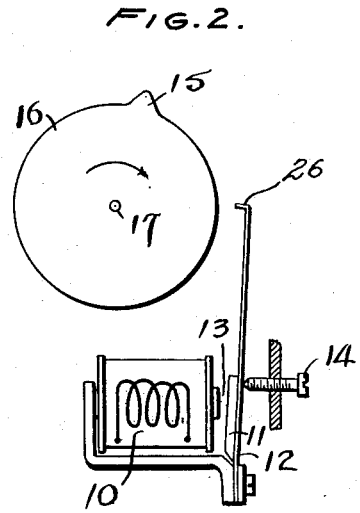
Fig. 2 is a section along line 2—2 of Fig. 1 with added detail.
Figure 3:
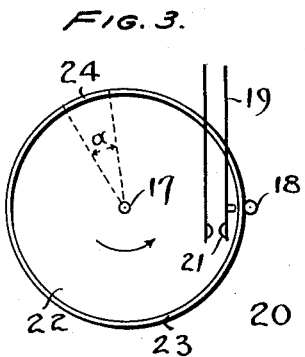
Fig. 3 is a section along line 3—3 of Fig. 1.
Figure 4:
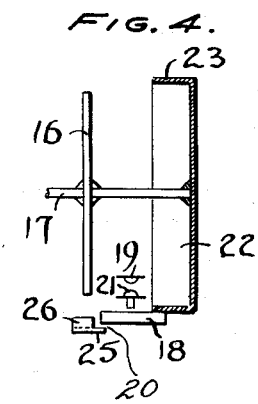
Fig. 4 is a fragmentary vertical section along the axis of rotation of elements of Fig. 1 parallel to the plane of the paper.

1 is the mechanical source of energy, e. g. a synchronous motor, with a reduction gear 2, driving the shaft 17 at continuous speed in the sense of the arrow. 10 is the electromagnet with armature 11 which is supported by a leaf spring 12. A cam disc 16 possesses a dwell 31 and a rise 15. In contrary to the cam disc shown in Fig. 2 the rise 15 which corresponds to the nose 15 of Fig. 2 occupies the greater part of the circumference of disc 16. This, however, is without importance for the operating of the device. The leaf spring 12 possesses two prolongations 25 the lower one which cam follower 26 is adjacent to the edge of disc 16 and the upper one of which is adjacent to the cross-piece 18 which is mounted on the middle leaf spring of the contact unit 19. A free movement 20 exists between the prolongation 18a of leaf spring 12 and the cross-piece 18 if the armature is in its initial position, viz. if the armature is released. The cross-piece 18 is fitted with a prolongation 18a which is stopped by the flange 23 of the control disc 22, but which may pass through the gap 24 of said flange.

If the current through the magnet reaches a certain value the armature is attracted. A movement of the armature is, however, only possible when the dwell 31 is opposite to the cam follower 26. Due to the free movement 20 the initial movement of the armature is executed without the armature being loaded by the springs of the contact unit 19 until the upper one of prolongations 25 touches the cross-piece 18. At that moment, however, due to the reduction of the air gap between the magnet and the armature the attraction force is sufficiently large to actuate the middle spring of the contact unit 19. As at that moment the gap 24 of the flange 23 is opposite to the prolongation 18a of cross-piece 18 the contact unit 19 can be closed. The cam disc continues its rotation and resets the armature to its initial position. The prolongation 18a of the cross-piece 18 is caught by the flange 23 of the control disc and the contact remains closed. After each revolution of the cam disc this operation is repeated as long as the current through the magnet exceeds said certain value. If by the effect of the control system, actuated by the closing of the contact unit or by any other reason, the current falls below that value the armature will no longer attract when the dwell passes the cam follower 26 and due to the effect of the middle leaf spring of the contact unit the prolongation 18a will pass through the gap 24 and the contact will be opened again.

Whereas with a customary relay the armature will be released and the contact opened only if the relay current falls below the release or falling-off value of the relay which is considerably lower than its attraction value, the contact unit 19 will remain closed only as long as the current in the magnet exceeds the attraction value. Below that value the armature will no longer attract after being returned into its initial position by the cam disc 16.

Member 18 is mounted on one arm of contact spring assembly 19 and fixedly connected thereto. If the armature 11 is attracted by magnet 10 the force exerted on member 19 by magnet 10 the force exerted on member 19 by extension 25 closes the contacts 21 at that moment when gap 24 passes under member 18. Stem 18a passes through gap 24 and upstanding flange 23 restrains the member 18 and maintains contacts 21 closed through one revolution of disc 22. Because of the angular positions of cam 15 and gap 24 the contacts 21 will remain closed as long as the armature 11 is attracted by magnet 10. Extension 25 falls into the event of cam 15 and prevents the member 18 from swinging out through gap 24 under the action of its spring arm 19. When the current in coil 10 falls below the value necessary to attract armature 11 the armature is reset by cam 15 and the member 18 is free to move through gap 24.

The above described arrangement yields a substantially constant regulated value. In the lower part of the range near the minimum allowable value the armature 11 is constantly in its position of rest, and the contacts 21 are inoperative. In the upper part of the range near the maximum allowable value on the other hand the armature 11 after being brought back to its position of rest again resumes its attracting operation, so that the contact arrangement 21 is constantly operated.

By use of additional means it is possible to control a magnitude between a selected maximum and minimum value in the sense that when the magnitude attains the maximum value the contact operation is effected and the reverse action begins only when the magnitude reaches the minimum value. For that purpose a suitable resistance 110 is switched into the energizing circuit 111 which is short circuited through a contact 21A of the system. As long as the contact arrangement is not active the effective value of flux producing ampere turns is determined by series resistance and the armature will attract only if the maximum value is exceeded. When the armature is attracted the resistance is short circuited through contact 21A so that the number of effective ampere turns increases correspondingly. After being mechanically restored the armature will again be attracted as long as the controlled electrical magnitude and the current required to actuate the armature stay above the minimum value.

A very advantageous arrangement is provided by a multiple system in which a common motor drives several regulation systems of the kind described whereby more than two values of maxima and minima may be set. With the combination of two such systems the effect of the previously described contact voltmeter with the arm contact can be utilized so that contact is made at maximum and minimum while in between both contacts are open. To best achieve the desired result with two systems the approach or make value of the one system is at the lower border of the regulation range and the similar value of the second system is transferred to the upper border of the range. Below the lower border value both systems are not attracted, in the intermediate range only that of the lower border value is attracted and above the upper border value both are attracted.

Figure 5:
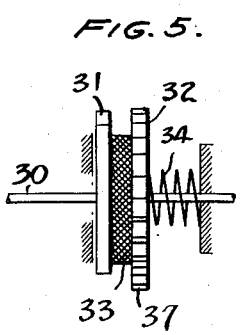
Fig. 5 is a schematic fragmentary elevation of a portion of one form of mechanical control.
Figure 6:
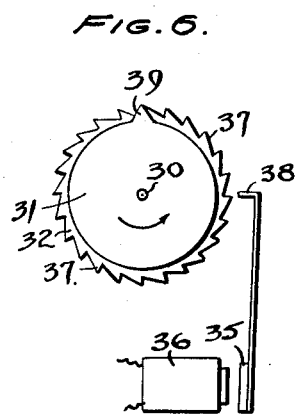
Fig. 6 is an end elevation of Fig. 5.
Figure 7:
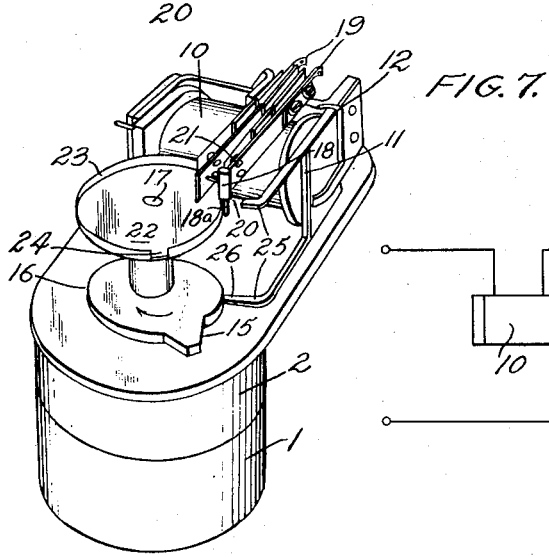
Fig. 7 is a perspective view of an assembly of one form of the invention.
Figure 8:
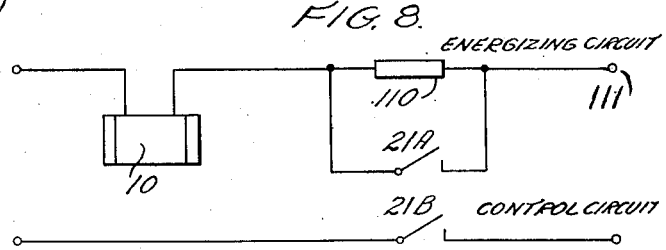
Fig. 8 is a schematic control circuit.

In addition to the described electrical evaluation there is also a mechanical evaluation of utmost importance. In plane of the controlled contact a speed regulated drive shaft may be used. Such a drive mechanism is used to advantage in carbon arc lamps for effecting regulated feed of the carbons in relation to the current or the voltage or some other suitable criteria. An embodiment of this sort is shown in principle in Figs. 5 and 6. This utilizes a control friction clutch. As above described the operation of the drive shaft 30 is effected by a suitable constant speed motor. The torque of the cam disc 31 is transmitted to the gear 32 through the agency of friction layer 33, because the spring 34 presses the assembly together. As long as the armature 35 is in the position of repose the cog wheel disc or gear 32 turns with cam disc 31, revolution for revolution. When the magnetic flux of coil 36 reaches a certain value the unloaded armature 35 moves and locks gear 32 by engaging one of the teeth 37 with projection 38. It should be noted that the attraction of the armature 35 is effected without imposing any load on the control mechanism. After each revolution the armature 35 is returned to its position of rest as described through the action of rise 39 on cam disc 31 and cog wheel gear 32 is temporarily released. Inasmuch as the armature 35 is immediately reattracted the gear 32 is again locked. By suitable designing, the rise 39 and the teeth 37 can be arranged so that the gear 32 is advanced only one tooth per revolution of cam 31. The ratio of the average speeds corresponds exactly in this case with the number of teeth. If the cam disc 31 possesses several rises 39 about its periphery the spin ratio of cam disc 31 and gear 32 would be represented by the value:

number of teeth/number of cam rises 39. In order to achieve the largest possible velocity ratio this ratio must be as large as possible. It will be seen that the ratio in Fig. 6 is twenty-four/one and that cam 31 makes twenty-four revolutions for every one of gear 32.

I claim:

1. In combination a relay contact actuating device for maintaining electrical values within selected limits, a coil for producing a magnetic field, a movable armature mounted adjacent said coil and subject to the magnetic field thereof, contact means mounted adjacent said armature, contact maintaining means, said armature acting to move part of said contact means toward said maintaining means, release means associated with said maintaining means and cooperating with periodically acting reset means for releasing said contacts and resetting said armature, said reset means comprising a cam mounted for rotation and arranged to move said armature away from said coil.

2. The combination set forth in claim 1, said release means being a slot in said curved surface, said contact means having a member arranged to pass through said slot under the action of said armature, bear against said maintaining surface and return through said slot under the action of spring means associated with said contact means.

3. The combination set forth in claim 2, said armature having a projection riding on said cam, said cam being constructed periodically to move said armature away from said coil and said contact means, the magnetic field of said coil acting to cause said armature to act on said contact means and cause said member thereof to pass through said gap and into the control of said maintaining surface, said member of said contact means being spring biased to return through said gap and assume an open position if said armature does not act upon said control means.

4. In a control system for maintaining electrical values at a selected limit, a control device, comprising in combination a magnet coil, energized in conformity with the electrical value to be controlled, a movable armature in operative relation to said magnet coil and subject to the magnet field thereof, a cam disc, a separate mechanical source of energy continuously rotating said cam disc, cam follower means actuated by said cam disc and movably to operate said armature, whereby said armature moves from an initial non-operating position to an operating position as said electrical value energizing said coil passes a selected limit, said cam disc operating to return said armature periodically to its initial position at regular intervals and additional means actuated by said armature when in its operative position, said additional means serving to bring back said electrical value to said limit.

5. In a control system for maintaining an electrical value at a selected limit, a control device, comprising in combination a magnet coil energized in conformity with the electrical value to be controlled, a movable armature in operative relation to said magnet field thereof, a continuously rotated cam disc, cam follower means actuated by said cam disc and movable to operate said armature, and at least one contact actuated by said armature, in which said armature moves from an initial non-operating position to an operating position if said electrical value energizing said coil passes a selected limit, and said cam disc periodically returns said armature to its initial position at regular intervals.

6. In a control system for maintaining a physical value at a selected limit, a control device comprising in combination a magnetic coil energized in conformity with the physical value to be controlled, a movable armature in operative relation to said magnet coil and subject to the magnetic field thereof, said armature being movable from an initial non-operating position to an operating position if said physical value passes a selected limit, a cam disc, a separate mechanical source of energy continuously rotating said cam disc, cam follower means actuated by said cam disc and movable to operate said armature, said cam disc periodically returning said armature to its initial position at regular intervals, and a friction clutch engaged by said armature when in operative position and having an input shaft which is continuously rotated by said separate source of energy and an output shaft which returns said physical value to said limit.

7. In combination with a contact actuated device for maintaining an electrical value substantially at a predetermined figure, a relay contact actuating device comprising a coil for producing a magnetic field, a movable armature adjacent said coil and subject to the magnetic field thereof, contact means mounted adjacent said armature and serving to influence said electrical value in a desired manner, said armature actuating said contact means when moved from its non-operating position to its operating position by said field and continuously actuated reset means for periodically resetting said armature to its inoperative position.

8. The combination set forth in claim 1, said contact maintaining means and said release means being fixedly connected to said reset means, said maintaining means having a curved maintaining surface arranged to bear against said contact means.

9. In a control system for maintaining electrical values at a selected limit, a control device comprising in combination a magnet coil energized in conformity with the electrical value to be controlled, a movable armature in operative relation to said magnet coil and subject to the magnetic field thereof, a cam disc, a separate mechanical source of energy continuously rotating said cam disc, cam follower means actuated by said cam disc movably to operate said armature, said armature being attracted as said electrical value energizing said coil exceeds a selected limit, and said disc operating to return said armature periodically to its unattracted initial position at regular intervals and additional means actuated by said armature when in its operative position, said additional means serving to bring back said electrical value to said limit.

10. In a control system for maintaining electrical values at a selected limit, a control device comprising in combination a magnet coil energized in conformity with the electrical value to be controlled, a movable armature in operative relation to said magnet coil and subject to the magnetic field thereof, a cam disc, a separate source of energy continuously rotating said cam disc, cam follower means actuated by said cam disc movably to operate said armature, said armature falling off if said electrical value energizing said coil falls below a selected limit, said cam disc operating to return said armature to its initial attracted position close to said magnet coil at regular intervals and additional means actuated by said armature when attracted and operating to return said value to said limit.

References Cited in the file of this patent

UNITED STATES PATENTS

| Number | Name | Date |
|---|---|---|
| 760,658 | Stoddard | May 24, 1904 |
| 905,782 | Barnum | Dec. 1, 1908 |
| 1,001,400 | Hertzberg et al. | Aug. 22, 1911 |
| 1,986,032 | Townsend | Jan. 1, 1935 |
| 2,037,572 | Goff | Apr. 14, 1936 |
| 2,121,179 | Sweetland | June 21, 1938 |
| 2,215,067 | Denison et al. | Sept. 17, 1940 |
| 2,298,073 | Stone | Oct. 6, 1942 |
| 2,358,633 | Goff | Sept. 19, 1944 |
| 2,489,098 | Marble | Nov. 22, 1949 |

FOREIGN PATENTS

| Number | Country | Date |
|---|---|---|
| 28,091 | Norway | July 23, 1917 |
| 668,041 | Germany | Nov. 25, 1938 |